Aug. 13, 1963
J. L. E. MORELLE
3,100,430
PHOTOGRAPHIC DEVICE
Filed Sept. 3, 1959
2 Sheets-Sheet 1
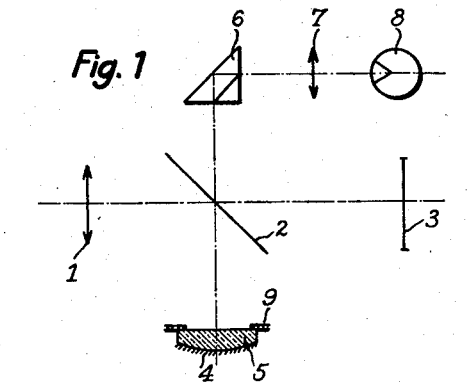
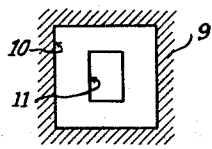
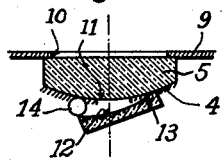
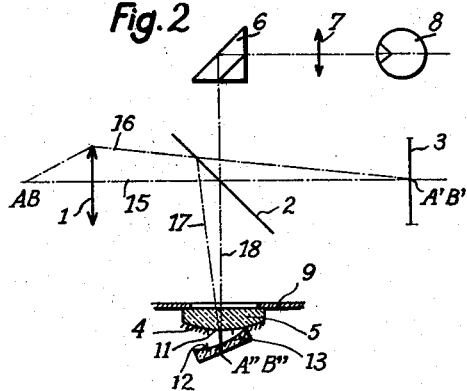
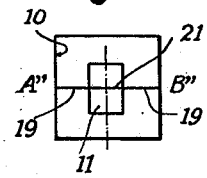
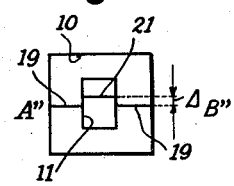
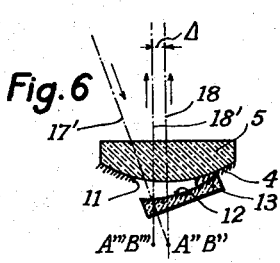
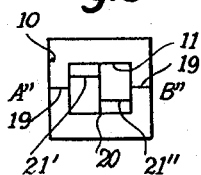
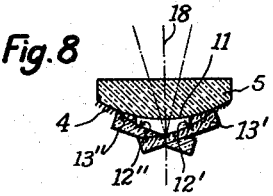
Inventor:
Jules Louis Eugène Morelle
by Michael S. Striker
Attorney Aug. 13, 1963
J. L. E. MORELLE
3,100,430
PHOTOGRAPHIC DEVICE
Filed Sept. 3, 1959
2 Sheets-Sheet 2
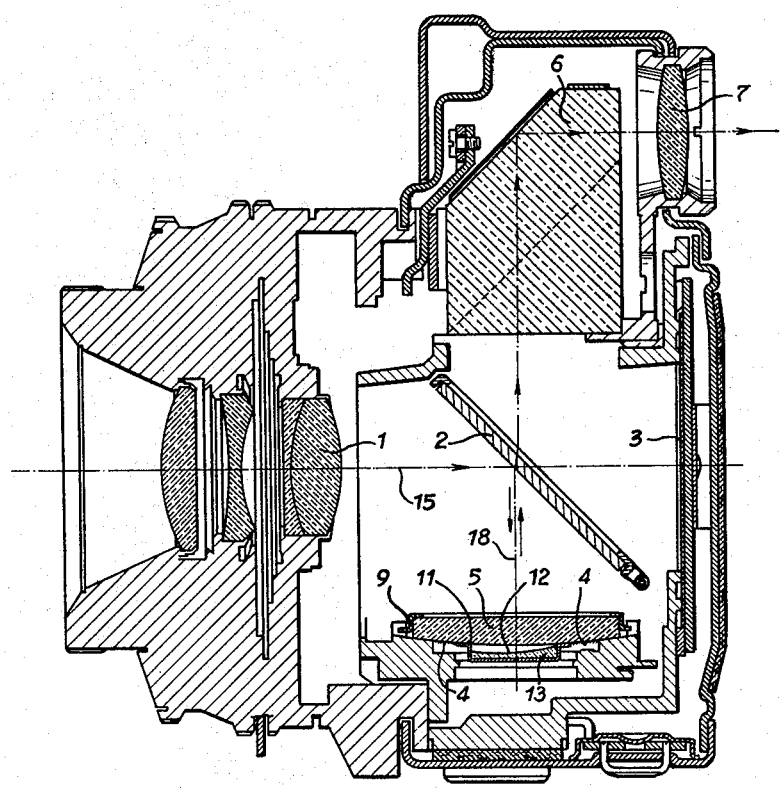
Fig: 10
Inventor
Jules Louis Eugène
Morelle
by
Michael S. Striker
Attorney

United States Patent Office 3,100,430
Patented Aug. 13, 1963

3,100,430
PHOTOGRAPHIC DEVICE
Jules Louis Eugène Morelle, Paris, France, assignor to Optique & Precision de Levallois, Seine, France, a company of France
Filed Sept. 3, 1959, Ser. No. 837,833
Claims priority, application France Sept. 9, 1958
4 Claims. (Cl. 95—42)

The present invention relates to photographic devices such as cameras.

In certain types of cameras, such as that shown in French Patent 1,012,436, it is possible for the operator to see an image of the subject with a structure which renders this image right side up. The sharpness of the image is determined solely by the judgment of the operator and it is not possible to take advantage of a split image type of focusing without a relatively complex structure necessitating parallax correction and preventing the use of a lens of desired power because of the limited space.

It is a primary object of the present invention to provide a photographic device of the general type referred to above wherein it is possible to use for the viewing of the image a lens of desired power, in spite of limited space.

A further object of the invention is to provide a photographic device not only capable of using a lens of desired power as referred to above but also capable of providing a split image type of focusing without any parallax.

A further object of the invention is to provide a relatively simple structure capable of operating reliably.

With the above objects in view the invention includes in a photographic device an objective which produces an image of the subject at a focal plane located along the optical axis of the objective. Between this focal plane and the objective is located a semi-transparent reflector which extends across the optical axis and directs the image from the optical axis to one side of the latter. At this one side of the optical axis is located a reflecting means structure in accordance with the invention, and this reflecting means directs the image from the semi-transparent reflector back through the latter to the other side of the optical axis where there is a means for rendering the reflecting image visible to the operator. In accordance with the invention the above reflecting means includes a concave reflecting surface directed toward the semi-transparent reflector and surrounding a transparent area which forms a window. Also in accordance with the invention there is located behind this window a separate reflector inclined with respect to the concave reflecting surface so that this separate reflector and the concave reflecting surface will provide different portions of the image directed to the semi-transparent reflector by the objective. These image portions will be seen by the operator to move with respect to each other during focusing of the objective, and when the image portions are aligned the operator knows that the objective is properly focused.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 schematically illustrates a structure of the type to which the invention is applied;

FIG. 2 schematically illustrates one embodiment of the invention;

FIG. 3 is an illustration of the areas seen by the operator;

FIG. 4 is an axial sectional illustration of a reflecting means of the invention of the type used in FIG. 2;

FIG. 5 shows a properly focused image as seen by the operator;

FIG. 6 diagrammatically illustrates the structure of FIG. 2 with an improperly focused image;

FIG. 7 illustrates how the image will appear when improperly focused according to FIG. 6;

FIG. 8 is a sectional elevation of another embodiment of a reflecting means according to the invention;

FIG. 9 illustrates the manner in which an image appears with the structure of FIG. 8; and FIG. 10 diagrammatically shows how the structure of FIG. 2 is incorporated into a camera.

Referring to FIG. 1, the objective 1 diagrammatically illustrated in FIG. 1 directs the image along the optical axis to a light-sensitive film 3 or the like located at the focal plane. Between this focal plane and the objective 1 is located a semi-transparent reflector 2 which extends across the optical axis and directs the image received from the objective to one side of the optical axis in a downward direction, as viewed in FIG. 1. A plano-convex lens 5 receives the image from the semi-transparent reflector 2, and the convex surface of the lens 5 is provided with a metal coating 4 of silver or the like so as to provide a mirror having a concave reflecting surface directed toward the semi-transparent reflector 2. The plane face of the lens 5 is masked by a suitable mask 9 which forms the area 10 defining the field of the image, as is apparent from FIG. 3 which shows the image area 10 limited by the mask 9.

The image which is focused on the reflecting surface of the metal coating 4 is reflected from the latter back through the semi-transparent reflector 2 across the optical axis to the other side thereof where a V-shaped or roof-prism 6 directs the image through an ocular 7 to the eye 8 of the operator.

The plane surface of the lens 5 and the catadioptric reflecting surface of the coating 4 cooperate to form a reflecting mirror and a field lens directing to the pupil of the eye of the operator an image from the exit pupil (in French "pupille de sortie" ; in German "Austrittpupille") of the objective 1 in such a way that this image is of uniform and maximum brightness. Moreover, it is possible to render the lens of the desired power (1/F) by the use of the catadioptric surface of the metal coating 4, and at the same time the image has all of the sharpness which can be provided by any conventional structure.

Referring to FIG. 2, it will be seen that the structure of FIG. 1 described above is modified, according to the invention, by eliminating the coating 4 from the central portion of the convex surface of the lens 5 so as to form at this central portion a transparent window 11, and below this window there is located in accordance with the invention second reflector formed for example by a metallic coating of silver or the like located on the concave surface 12 of the plano-concave lens 13 shown in FIG. 2. It would be also possible to use a plane mirror for said second reflector, instead of the concave mirror 12 shown on the drawing. This separate reflector 12, 13 is fixed to the lens 5 at the rear, nonreflecting surface of the coating 4 and extends angularly with respect to the lens 5, as illustrated in FIG. 2, the separate reflector 12, 13 being located behind the window 11. As is shown in FIG. 4, there is located behind the coating 4 spaced from the window 11 a spacer 14 in the form of a block, wedge or the like, this spacer 14 determining the angle of the separate reflector 12, 13 with respect to the optical axis of the lens 5.

As was pointed out above, the parts 4, 5 are designed and adapted so that the image from the exit-pupil of the objective 1, is formed through the semi-transparent reflector 2 which is relatively thin, the roof-prism 6 and the ocular 7, like an eye-ring near the eye 8 of the operator. This image which is seen by the operator will of course be right side up.

As is indicated schematically in FIG. 2, a horizontal line AB perpendicular to the plane of FIG. 2 and forming the subject to be photographed will produce in the focal plane, as a result of the relationship between the objective 1 and the focal plane, the image A'B' indicated in FIG. 2. Of course, when the film 3 is exposed the semi-transparent reflector 2 is not in the position illustrated in FIG. 2. This reflector 2 is capable of turning to an idle position spaced from the optical axis in a manner similar to the tiltable mirror of a reflex camera. Thus, before an exposure is made the reflector 2 is turned away from the optical axis and a shutter which is located just ahead of the local plane in front of the light-sensitive surface of the film 3 is actuated to make the exposure.

As is shown in FIG. 2, when the objective is properly focused the ray 16 will intercept the optical axis 15 at the focal plane to provide a sharp image A'B' of the subject AB. The optical axis 15 is reflected by the semi-transparent reflector 2 along the path 18 shown in FIG. 2, while the light ray 16 is reflected by the reflector 2 along the path 17 indicated in FIG. 2, and, as shown in FIG. 2, the various optical parts of the system are such that when the paths 17 and 18 intersect at the reflecting surface 12 the objective 1 is properly focused. The distance of the reflecting means 5, 13 from the optical axis corresponds with the distance of the local plane from the intersection of the optical axis 15 with the semi-transparent reflector 2 so that when the image produces the rays 17 and 18 intersecting at the reflecting surface 12 the image will be sharply focused at the local plane when the exposure is subsequently made.

As is indicated in FIG. 5, the image seen by the operator is composed of the area 10 and the image of the window 11 located centrally within the area 10. On opposite sides of the image of window 11 the coating 4 will provide images 19 of the line AB while within the area 11 an image 21 will be provided, this image 21 being the portion of the line AB whose image is provided by the separate reflector 12, 13. When the central image portion 21 is aligned with the lateral image portions 19, as indicated in FIG. 5, the operator knows that the objective is properly focused. Thus, a continuous image line A"B" as shown in FIG. 5 informs the operator that the objective is properly focused.

In the event that the objective is not properly focused, then, as indicated schematically in FIG. 6, the rays 17 and 18 will intersect at A"B" at a theoretical point located beyond the surface 12, and the ray 17' will intercept the surface 12 at a point displaced from the optical axis 18 to the left, as viewed in FIG. 6, by the illustrated distance Δ, so that the ray 17' will be reflected back through the same transparent reflector to the means 6, 7 for providing an image visible to the operator along the path 18' shown in FIG. 6. The image which is now seen by the operator is illustrated in FIG. 7 which shows the image portion 21 displaced with respect to the image portions 19, this image portion 21 corresponding to the position A'''B''' shown in FIG. 6. The operator will continue to change the focus of the objective until an image as shown in FIG. 5 is obtained.

Instead of a single separate reflector 12, 13 a pair of such reflectors may be provided as indicated in FIG. 8. Thus, the separate reflector 12', 13' of FIG. 8 is inclined oppositely to the reflector 12", 13", of FIG. 8. Each of these separate reflectors has, for example, the form of a half plano-concave lens. These lenses are respectively arranged on opposite sides of a plane 20 indicated in the image illustrated in FIG. 9. FIG. 9 illustrates an image provided by the structure of FIG. 8 before the objective is properly focused. Thus, the reflecting surface of the coating 4 will still provide the image portions 19 of the image A"B". However, within the area defined by the window 11 there will be a pair of image portions 21' and 21" displaced in opposite directions with respect to the image portions 19, and the operator by focusing the objective can align all of the image portions of FIG. 9 so as to properly focus the device.

The separate reflector 12, 13 can be connected to the coating 4 at the non-reflecting rear surface of the latter by any suitable transparent material or can be mounted in the illustrated position within any other suitable means providing the desired angular displacement of the separate reflector 12, 13 with respect to the lens 5.

Of course, while the invention has been described above in connection with an image of a horizontal line, the invention may of course be applied to an image of a vertical line in which case the reflecting means 5, 13 and means 6, 7 for rendering the image visible to the operator would be displaced by 90° so as to be located at opposite sides of and at the same elevation as the optical axis instead of below and above the optical axis as indicated in FIG. 2. Also, the window 11 need not be rectangular and can have any desired configuration. For example, this window may be circular. Also, the center of the window can be on the optical axis or displaced with respect to the optical axis.

Referring to FIG. 10, the structure described above is schematically shown incorporated into a camera. Thus, the film 3 is positioned in the focal plane by a suitable pressure plate and a suitable frame carries the separate reflector 12, 13 positioned behind the window 11, this frame engaging the rear surface of the coating 4 around the window 11. The tiltable semi-transparent reflector 2 which is located between the objective 1 and the film 3, as indicated in FIG. 10, is turnable downwardly in a counter-clockwise direction, as viewed in FIG. 10, around a pivot connected to the lower right end of the frame carrying the reflector 2, as viewed in FIG. 10, so that before an exposure is made the reflector 2 can be turned down closely adjacent to the mask 9 and out of the path of the light rays travelling along the optical axis 15. FIG. 10 also illustrates the structure which carries the prism 6 and the circular ocular 7.

It will be understood that each of the elements described above, or two or more together, may also find a useful application in other types of photographic devices differing from the types described above.

While the invention has been illustrated and described as embodied in photographic focusing devices, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a photographic device, in combination, an objective for directing to a focal plane an image of a subject to be photographed; a semi-transparent reflector located between said objective and focal plane and crossing the optical axis of said objective for directing an image of the subject to one side of the optical axis; reflecting means located at said one side of said optical axis for receiving the image from said semi-transparent reflector and for directing the image back through said semi-transparent reflector across the optical axis to the other side thereof; and means located at said other side of said optical axis for rendering the image visible to the operator, said reflecting means including a concave reflecting surface directed toward said semi-transparent reflector, and a transparent window surrounded by said concave reflecting surface, and a separate reflector located behind said window and extending angularly with respect to said concave reflecting surface so that said separate reflector and concave reflecting surface will provide different image portions whose position with respect to each other will change during focusing of the objective to indicate to the operator that the objective is properly focused when said image portions are aligned, said reflecting means including a plano-convex lens having a plane surface directed toward said semi-transparent reflector and having a convex surface carrying a metallic coating which forms said concave reflecting surface, said metallic surface surrounding a portion of the convex surface of the lens which is not covered with said coating so as to form said window.

2. In a photographic device, in combination, an objective for directing to a focal plane an image of a subject to be photographed; a semi-transparent reflector located between said objective and focal plane and crossing the optical axis of said objective for directing an image of the subject to one side of the optical axis; reflecting means located at said one side of said optical axis for receiving the image from said semi-transparent reflector and for directing the image back through said semi-transparent reflector across the optical axis to the other side thereof; and means located at said other side of said optical axis for rendering the image visible to the operator, said reflecting means including a concave reflecting surface directed toward said semi-transparent reflector and a transparent window surrounded by said concave reflecting surface, and a separate reflector located behind said window and extending angularly with respect to said concave reflecting surface so that said separate reflector and concave reflecting surface will provide different image portions whose position with respect to each other will change during focusing of the objective to indicate to the operator that the objective is properly focused when said image portions are aligned, said reflecting means including a plano-convex lens having a plane surface directed toward said semi-transparent reflector and having a convex surface carrying a metallic coating which forms said concave reflecting surface, said separate reflector being in the form of a concave mirror directed toward said window and formed by a metallized concave surface of a plano-concave lens having its concave surface directed toward said window.

3. In a photographic device as recited in claim 1, said window being rectangular.

4. In a photographic device as recited in claim 1, said window being circular.

References Cited in the file of this patent

UNITED STATES PATENTS 2,914,997     Grey _____ Dec. 1, 1959

FOREIGN PATENTS 323,010     Switzerland _____ Aug. 31, 1957
1,012,436     France _____ Apr. 16, 1952